United States Patent
Avalos

(10) Patent No.: US 11,511,952 B2
(45) Date of Patent: *Nov. 29, 2022

(54) DOCK DOOR AUTOMATION SYSTEM AND METHOD

(71) Applicant: Niagara Bottling, LLC, Diamond Bar, CA (US)

(72) Inventor: Robert Paul Avalos, Ontario, CA (US)

(73) Assignee: Niagara Bottling, LLC, Diamond Bar, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 16/883,324

(22) Filed: May 26, 2020

(65) Prior Publication Data

US 2020/0283247 A1   Sep. 10, 2020

Related U.S. Application Data

(63) Continuation of application No. 16/138,442, filed on Sep. 21, 2018, now Pat. No. 10,696,499, which is a
(Continued)

(51) Int. Cl.
*B65G 69/00* (2006.01)
*E06B 3/44* (2006.01)
(Continued)

(52) U.S. Cl.
CPC .............. *B65G 69/003* (2013.01); *B60P 1/00* (2013.01); *B60Q 9/00* (2013.01); *B65G 69/006* (2013.01);
(Continued)

(58) Field of Classification Search
CPC ... B60P 1/00; B60P 3/00; B60Q 9/002; B65G 69/001; B65G 69/003; B65G 69/005;
(Continued)

(56) References Cited

U.S. PATENT DOCUMENTS

| 3,138,812 A | 6/1964 | Prosser |
| 3,290,709 A | 2/1966 | Whitenack, Jr. et al. |

(Continued)

FOREIGN PATENT DOCUMENTS

| CA | 1146309 A | 5/1983 |
| DE | 3049611 A1 | 7/1982 |

(Continued)

OTHER PUBLICATIONS

"Redacted Proposal Dock Equipment Automation," Jul. 9, 2013, 10 pages.

(Continued)

*Primary Examiner* — Crystal J Barnes-Bullock
(74) *Attorney, Agent, or Firm* — Michael Best & Friedrich LLP

(57) ABSTRACT

A system and method are provided for automated engaging of a truck trailer at a loading dock. Sensors measure a distance and an angle of alignment between the incoming trailer and a wall of the loading dock. An outside lighting system guides a truck driver backing the trailer toward the dock door. A vehicle restraint system fixates the trailer within the loading dock in response to signals from the sensors. An overhead dock door opens once the trailer is successfully fixated by the vehicle restraint system. A dock leveler deploys after the overhead dock door opens. An inside dock light indicates to dock personnel that the trailer is ready to be serviced. Once servicing of the trailer is finished, an automated release of the trailer from the loading dock may be initiated by PLC communication.

20 Claims, 6 Drawing Sheets

Related U.S. Application Data continuation of application No. 14/855,175, filed on Sep. 15, 2015, now Pat. No. 10,106,342.

(60) Provisional application No. 62/051,632, filed on Sep. 17, 2014.

(51) Int. Cl.
*B60P 1/00* (2006.01)
*B65G 69/28* (2006.01)
*B60Q 9/00* (2006.01)

(52) U.S. Cl.
CPC ............ *B65G 69/2882* (2013.01); *E06B 3/44* (2013.01); *B65G 2207/40* (2013.01); *G05B 2219/10* (2013.01); *G05B 2219/2638* (2013.01)

(58) Field of Classification Search
CPC .............. B65G 69/006; B65G 69/2805; B65G 69/2882; B65G 2203/044; B65G 2207/40; E06B 3/44; G05B 15/00; G05B 2219/19; G05B 2219/14; G05B 2219/2638; G05D 1/0225; G05D 2201/0216
See application file for complete search history.

(56) References Cited

U.S. PATENT DOCUMENTS

| | | | |
|---|---|---|---|
| 3,290,710 A | 12/1966 | Whitenack, Jr. |
| 3,599,262 A | 8/1971 | Carder et al. |
| 4,146,888 A | 3/1979 | Grunewald et al. |
| 4,279,050 A | 7/1981 | Abbott |
| 4,692,755 A | 9/1987 | Hahn |
| 4,727,613 A | 3/1988 | Alten |
| 4,843,373 A | 6/1989 | Trickle et al. |
| 4,977,635 A | 12/1990 | Alexander |
| 5,191,328 A | 3/1993 | Nelson |
| 5,205,010 A | 4/1993 | Hageman |
| 5,299,386 A | 4/1994 | Naegelli et al. |
| 5,396,676 A | 3/1995 | Alexander et al. |
| 5,440,772 A | 8/1995 | Springer et al. |
| 5,453,735 A | 9/1995 | Hahn |
| 5,586,355 A | 12/1996 | Metz et al. |
| 5,774,920 A | 7/1998 | Alexander |
| 5,803,701 A | 9/1998 | Filiberti et al. |
| 5,826,291 A | 10/1998 | Alexander |
| 5,831,540 A | 11/1998 | Sullivan et al. |
| 5,881,780 A | 3/1999 | Matye et al. |
| 6,147,625 A | 11/2000 | Decker |
| 6,205,721 B1 | 3/2001 | Ashelin et al. |
| 6,233,885 B1 | 5/2001 | Hoffmann et al. |
| 6,311,352 B1 | 11/2001 | Springer |
| 6,329,931 B1 | 12/2001 | Gunton |
| 6,409,452 B1 | 6/2002 | Zibella et al. |
| 6,499,169 B2 | 12/2002 | Hahn et al. |
| 6,502,268 B2 | 1/2003 | Ashelin et al. |
| 6,634,139 B1 | 10/2003 | Metz |
| 6,651,581 B2 | 11/2003 | Gauthier |
| 6,693,524 B1 | 2/2004 | Payne |
| 6,781,516 B2 | 8/2004 | Reynard et al. |
| 6,812,849 B1 | 11/2004 | Ancel |
| 6,880,301 B2 | 4/2005 | Hahn et al. |
| 6,896,469 B2 | 5/2005 | Alexander |
| 6,975,226 B2 | 12/2005 | Reynard et al. |
| 7,045,764 B2 | 5/2006 | Beggs et al. |
| 7,165,486 B2 | 1/2007 | Alexander et al. |
| 7,185,463 B2 | 3/2007 | Borgerding |
| 7,213,285 B2 | 5/2007 | Mitchell |
| 7,256,703 B2 | 8/2007 | Duvernell et al. |
| 7,274,300 B2 | 9/2007 | Duvernell |
| 7,380,375 B2 | 6/2008 | Maly et al. |
| 7,384,229 B2 | 6/2008 | Gleason |
| 7,752,696 B2 | 7/2010 | Grunewald et al. |
| 7,954,606 B2 | 6/2011 | Tinone et al. |
| 8,065,770 B2 | 11/2011 | Proffitt et al. |
| 8,307,588 B2 | 11/2012 | Hoffmann et al. |
| 8,424,254 B2 | 4/2013 | Ballester |
| 8,443,945 B2 | 5/2013 | Perkins |
| 8,497,761 B2 | 7/2013 | McNeill et al. |
| 8,499,897 B2 | 8/2013 | Brooks et al. |
| 8,547,234 B2 | 10/2013 | Maly et al. |
| 8,590,087 B2 | 11/2013 | Swessel et al. |
| 8,596,949 B2 | 12/2013 | Harrington |
| 8,616,826 B2 | 12/2013 | Cotton et al. |
| 8,678,736 B2 | 3/2014 | Anderson et al. |
| 8,733,034 B2 | 5/2014 | Ballester |
| 8,789,850 B2 | 7/2014 | Kimener et al. |
| 8,806,689 B2 | 8/2014 | Riviere et al. |
| 8,838,279 B2 | 9/2014 | Blackwell |
| 8,890,475 B1 | 11/2014 | Becker |
| 8,926,254 B2 | 1/2015 | Pocobello et al. |
| 9,284,135 B2 | 3/2016 | Sveum |
| 9,290,336 B2 | 3/2016 | Ballester |
| 9,751,702 B1 | 9/2017 | Hoofard et al. |
| 9,776,511 B2 | 10/2017 | Brooks et al. |
| 9,830,825 B2 | 11/2017 | Anstett |
| 9,845,209 B2 | 12/2017 | Stone et al. |
| 9,926,148 B2 | 3/2018 | Hochstein et al. |
| 9,938,020 B2 | 4/2018 | Clifford et al. |
| 9,950,881 B2 | 4/2018 | Bastian, II |
| 10,005,627 B2 | 6/2018 | Girtman et al. |
| 10,081,504 B2 | 9/2018 | Walford et al. |
| 10,106,342 B2 | 10/2018 | Avalos |
| 10,934,113 B2 * | 3/2021 | Hochstein .............. B60Q 9/002 |
| 2001/0052434 A1 | 12/2001 | Ehrlich et al. |
| 2003/0145535 A1 | 8/2003 | DiBiase et al. |
| 2004/0075046 A1 | 4/2004 | Beggs et al. |
| 2005/0028723 A1 | 2/2005 | Ancel |
| 2006/0051196 A1 | 3/2006 | McDonald |
| 2006/0137261 A1 | 6/2006 | Maly |
| 2006/0181391 A1 | 8/2006 | McNeill et al. |
| 2006/0266275 A1 | 11/2006 | DiBiase et al. |
| 2006/0267745 A1* | 11/2006 | Larson .................... B60D 1/36 340/431 |
| 2007/0248440 A1 | 10/2007 | Andersen et al. |
| 2008/0010757 A1 | 1/2008 | Hochstein et al. |
| 2008/0042865 A1 | 2/2008 | Shepard et al. |
| 2008/0124203 A1 | 5/2008 | McDonald |
| 2008/0127435 A1 | 6/2008 | Maly et al. |
| 2008/0141470 A1 | 6/2008 | Belongia |
| 2008/0223667 A1 | 9/2008 | Tinone et al. |
| 2009/0274542 A1 | 11/2009 | Pocobello et al. |
| 2010/0146719 A1 | 6/2010 | Swessel et al. |
| 2010/0212170 A1 | 8/2010 | Marsee |
| 2010/0269273 A1 | 10/2010 | Proffitt et al. |
| 2011/0075441 A1 | 3/2011 | Swessel et al. |
| 2011/0203059 A1 | 8/2011 | Whitley et al. |
| 2011/0219632 A1 | 9/2011 | Odom |
| 2012/0025964 A1 | 2/2012 | Beggs et al. |
| 2013/0291455 A1 | 11/2013 | Wiegel et al. |
| 2013/0320828 A1 | 12/2013 | Nitzsche et al. |
| 2014/0186146 A1 | 7/2014 | Alan |
| 2014/0309887 A1 | 10/2014 | Lavoie |
| 2015/0009046 A1 | 1/2015 | Senfleben et al. |
| 2015/0047132 A1 | 2/2015 | Sveum et al. |
| 2015/0047133 A1 | 2/2015 | Sveum |
| 2015/0375947 A1 | 12/2015 | Hochstein et al. |
| 2016/0009177 A1 | 1/2016 | Brooks et al. |
| 2016/0104364 A1 | 4/2016 | Brooks et al. |
| 2017/0043967 A1 | 2/2017 | Walford et al. |
| 2017/0341514 A1 | 11/2017 | Brooks et al. |
| 2017/0341515 A1 | 11/2017 | Brooks et al. |
| 2017/0341516 A1 | 11/2017 | Brooks et al. |
| 2017/0368939 A1 | 12/2017 | Brooks et al. |
| 2018/0346029 A1 | 12/2018 | Kabos et al. |
| 2019/0002216 A1 | 1/2019 | Walford et al. |
| 2019/0064835 A1 | 2/2019 | Hoofard et al. |
| 2019/0188936 A1 | 6/2019 | Sivill et al. |

(56) References Cited

U.S. PATENT DOCUMENTS

| | | |
|---|---|---|
| 2019/0197716 A1 | 6/2019 | Trajkovic et al. |
| 2020/0299077 A1 | 9/2020 | Harres et al. |

FOREIGN PATENT DOCUMENTS

| | | |
|---|---|---|
| EP | 1317963 B1 | 6/2003 |
| EP | 1317963 B1 | 5/2009 |
| EP | 2206664 A1 | 7/2010 |
| EP | 2360110 A1 | 8/2011 |
| EP | 2865622 A1 | 4/2015 |
| GB | 2144706 A | 3/1985 |
| WO | WO02070383 A1 | 9/2002 |
| WO | WO2008008699 A1 | 1/2008 |
| WO | WO2009073001 | 6/2009 |
| WO | 2010064989 A1 | 6/2010 |
| WO | WO2010064989 A1 | 6/2010 |
| WO | 2015/166339 A1 | 11/2015 |
| WO | WO2015166339 A1 | 11/2015 |

OTHER PUBLICATIONS

Crawford, "Crawford Docking Equipment Product Datasheet," last retrieved from [http://www.crawfordsolutions.com.sa/AAES/crawfordsolutionsCOM/EN/Products/Docking/Dock%20levellers/Docking%20equipmenl/1.%20Product%20datasheel/PD_DEQP_ALL_EN_ORG.pdf] on Jun. 16, 2015, 16 pages.

Carlo et al., "II., Real-Time Dock Door Monitoring System Using a Kinect Sensor", dated Jan. 1, 2014, URL: https://www.mhi.org/downloads/learning /cicmhe/colloquium/2014/02-Carlo-%20paper.pdf, (10 Pages).

\* cited by examiner

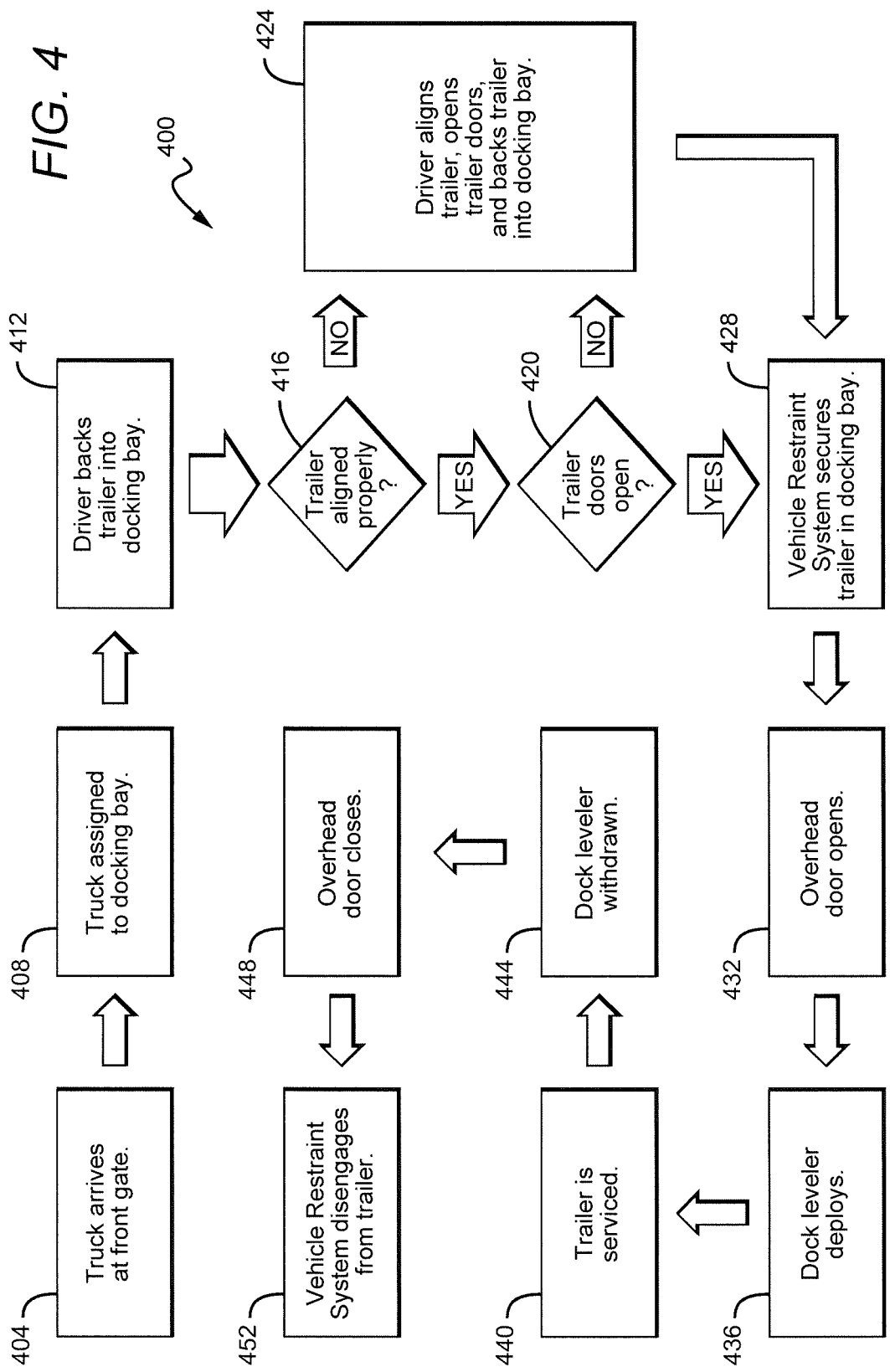

| | Description | | |
|---|---|---|---|
| ☐ | Truck Features | # of pallets to load on the truck | Ranges from 19 - 22 |
| | | Floor types (fat.corrugated) | Flat |
| ☐ | Trailer Positioning | 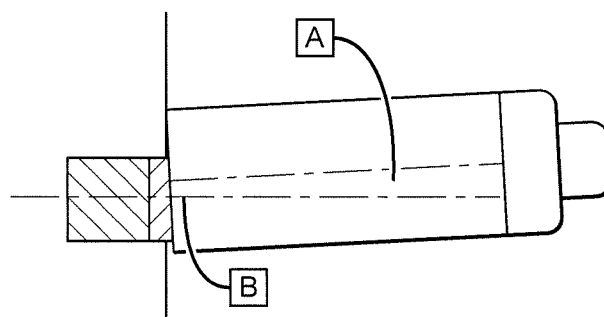 | |
| | | A = Maximum angle difference between dock and trailer | 1° |
| | | B = Maximum offset from dock door centerline | 6" (152 mm) |
| ☐ | Trailers Features | 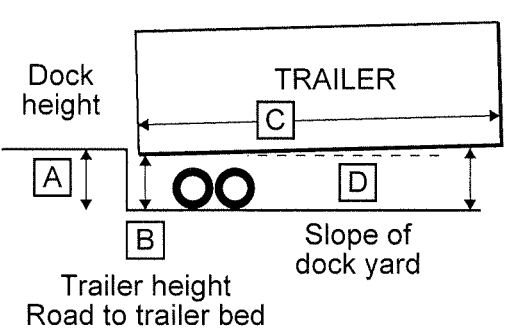 | |
| | | A = Dock height | Expected 48" (1,220 mm) |
| | | B = Trailer height | Max +/- 4" (102mm) in respect to Dock Height (A) |
| | | C = Length trailer | Max. measured 52.7 feet (16,070mm) |
| | | D = Slope between trailer and dock | 1° |

FIG. 5

| | Description | |
|---|---|---|
| Dock and trailer dimensions | *[diagram of trailer at dock with labels A, B, C, D, E]* | |
| | A - Dock door height | Not significant if higher than "C" |
| | B - Effective height (when ramp up) | Not significant if higher than "C" |
| | C - Effective trailer height (when ramp up) | 90" (2,286mm) is the minimum height of the "free space" the LGV has at the entrance door (considering the worst case of 4" difference between the dock level and the trailer floor) |
| | D - Trailer height (minimum) | 90" (2,286mm) |
| | E - Max ramp up height above dock | Max +/- 4" (102mm) in respect to Dock Height (A) |
| Ramp Dimension | *[diagram of trailer top view with labels A, B, C, D, E, F, G, H]* | |
| | A - Lip length | 18" (457mm) |
| | B - Ramp length | 87" (2,210mm) |
| | C - Ramp width | 72" (1,830mm) steel plate - 74" (1,880mm) opening |
| | D - Ramp - trailer wall (left) | 7" (180mm) - 17.7" (450mm) |
| | E - Ramp - trailer wall (right) | 7" (180mm) - 17.7" (450mm) |
| | F - Ramp - dock door (left) | 17.4" (442mm) |
| | G - Ramp - dock door (right) | 17.4" (442mm) |
| | H - Trailer inside width (minimum) | 94.9" (2,410mm) trailer door opening on "roll up doors" |
| | H - Trailer inside width (maximum) | 102" (2,590mm) |

FIG. 6

DOCK DOOR AUTOMATION SYSTEM AND METHOD

PRIORITY

This application is a continuation of U.S. patent application Ser. No. 16/138,442, filed Sep. 21, 2018, which is a continuation of U.S. patent application Ser. No. 14/855,175, filed Sep. 15, 2015, now issued U.S. Pat. No. 10,106,342, which claims the benefit of and priority to U.S. Provisional Application No. 62/051,632, filed Sep. 17, 2014, the entirety of which are incorporated herein by reference in their entireties.

FIELD

The field of the present disclosure generally relates to docking truck trailers. More particularly, the field of the present disclosure relates to a system and a method for automated engaging and disengaging of a truck trailer at a loading dock.

BACKGROUND

A loading dock or loading bay is an area of a building where products and goods are loaded and unloaded. Loading docks suitable for truck trailers are commonly found on commercial buildings, industrial buildings, and warehouses for delivery and shipping of equipment, products, and goods. Shipping plants and distribution centers typically have a multiplicity of loading docks, and service a continual stream of incoming and outgoing trucks. A conventional shipping process utilized by many shipping plants and distribution centers requires a dock coordinator or a forklift operator to manually open each dock door for an incoming trailer and then use a dock commander control system to engage a vehicle restraint and dock leveler.

What is needed is a system and method whereby the engagement/disengagement process of a whole set of dock equipment is automated, including at least the dock door, the vehicle restraint, the dock leveler, and trailer positioning and alignment. It is envisioned that a shipping clerk, stationed at a front gate or security post, would be able to engage dock positions remotely while assigning dock doors to incoming trucks. Preferably, the dock door would open automatically once a trailer is properly aligned at the dock, and then the vehicle restraint and dock leveler would engage automatically once the dock door opens fully. It is further envisioned that forklift operators could disengage the dock equipment and release each trailer by simply pushing a Programmable Logic Controller (PLC). Once the trailer is disengaged, the dock position would then appear available to the shipping clerk.

SUMMARY

A system and a method are provided for servicing a truck trailer at a docking bay. The system comprises a programmable logic controller (PLC) system configured to operate the docking bay to accept, secure, and release the truck trailer. A first sensor and a second sensor are configured to detect an angle between a centerline of the docking bay and the truck trailer during backing into the docking bay. At least a third and fourth sensors are configured to detect a distance between a wall of the docking bay and the truck trailer. An outside lighting system is in communication with the PLC system and configured to provide feedback to a truck driver during backing of the truck trailer into the docking bay. The outside lighting system is configured to operate in response to signals passed from the sensors to the PLC system. A vehicle restraint system is in communication with the PLC system and configured to engage the truck trailer. An overhead door is configured to be opened by the PLC system once the trailer is engaged by the vehicle restraint system. A dock leveler is configured to be deployed by the PLC system after the overhead door is open. An inside dock light in communication with the PLC system is configured to indicate a status of the truck trailer to dock personnel.

In an exemplary embodiment, a system for servicing a truck trailer at a docking bay comprises a programmable logic controller (PLC) system configured to operate the docking bay to accept, secure, and release the truck trailer; at least a first sensor and a second sensor to detect an angle between a centerline of the docking bay and the truck trailer during backing into the docking bay; at least a third and fourth sensors to detect a distance between a wall of the docking bay and a rearmost portion of the truck trailer; an outside lighting system in communication with the PLC system and configured to provide feedback to a truck driver during backing the truck trailer into the docking bay, the lighting system configured to operate in response to signals from the first, second, third, and fourth sensors; a vehicle restraint system in communication with the PLC system and configured to fixate the truck trailer within the docking bay; an overhead door in communication with the PLC system and configured to open once the trailer is fixated by the vehicle restraint system; a dock leveler in communication with the PLC system and configured to deploy after the overhead door opens; and an inside dock light in communication with the PLC system and configured to indicate a status of the truck trailer to dock personnel.

In another exemplary embodiment, the first sensor and the second sensor are positioned with a substantially equivalent distance from a dock centerline and a substantially equal height above the top of a dock shelter. In another exemplary embodiment, each of the first sensor and the second sensor comprises two sensors positioned adjacent to one another, such that the sensors have a substantially equal height above the top of the shelter, the two sensors being oriented vertically so as to detect the presence of a top of the truck trailer. In another exemplary embodiment, the two sensors are laser guided vehicle (LGV) sensors.

In another exemplary embodiment, the third and fourth sensors further comprise a first sensor and a second sensor located below the floor of the docking bay. In another exemplary embodiment, the first and second sensors are LGV sensors. In another exemplary embodiment, the vehicle restraint system engages the truck trailer following a time delay after the truck trailer is sufficiently positioned within the docking bay. In another exemplary embodiment, once the vehicle restraint system engages the truck trailer, the overhead door is opened and the dock leveler is deployed. In another exemplary embodiment, the PLC system is configured to switch to an Alarm Mode and flash the outside signal lights and the inside dock light red and green simultaneously to indicate a fault when the vehicle restraint system fails to properly engage the truck trailer.

In another exemplary embodiment, the outside lighting system comprises outside signal lights configured to indicate to the driver when to move the truck trailer during backing into and exiting the docking bay. In another exemplary embodiment, the outside signal lights flash green to indicate to the truck driver that the docking bay is ready to receive the truck trailer, and wherein the inside dock light flashes red to indicate to dock personnel that the trailer is not yet ready for servicing. In another exemplary embodiment, the outside signal lights switch from greed to red to indicate to the truck driver to stop backing the trailer into the docking bay once the truck trailer is sufficiently aligned and centered within the docking bay.

In another exemplary embodiment, the outside lighting system comprises directional arrow lights configured to help the driver to properly orient the truck trailer with respect to the centerline of the docking bay, and wherein a passenger side and a driver side of the directional arrow lights communicate to the driver directions to steer the trailer. In another exemplary embodiment, the directional arrow lights remain off while the truck trailer is properly aligned with the centerline. In another exemplary embodiment, either the passenger side or the driver side of the directional arrow lights illuminate with a steady yellow color when the trailer is not properly aligned with the centerline. In another exemplary embodiment, either the passenger side or driver side of the directional arrow lights flash yellow when the trailer has an improper offset angle relative to the centerline of the docking bay.

In an exemplary embodiment, a method for providing an automated docking bay comprises positioning one or more sensors to detect an orientation of a truck trailer and the docking bay; coupling a programmable logic controller (PLC) system with the one or more sensors; configuring the PLC system to signal a truck driver in response to orientation data received from the one or more sensors; placing the PLC system in communication with a vehicle restraint system, such that the PLC system causes the vehicle restraint system to engage and fixate the truck trailer in response to the orientation data; configuring the PLC system to raise an overhead door and deploy a dock leveler once the vehicle restraint system fixates the truck trailer; and configuring the PLC system to indicate a status of the truck trailer to dock personnel.

In another exemplary embodiment, positioning one or more sensors comprises deploying at least a first sensor and a second sensor so as to detect at least one angle of an alignment of the truck trailer relative to a centerline of the docking bay, and deploying at least one sensor to detect a distance between a wall of the docking bay and a rearmost portion of the truck trailer. In another exemplary embodiment, configuring the PLC system to signal the truck driver comprises implementing outside signal lights whereby the PLC system may direct the driver during backing into and exiting the docking bay. In another exemplary embodiment, configuring the PLC system to deploy the dock leveler comprises receiving signals from at least one of the one or more sensors so as to determine that the dock leveler is clear of obstruction before deployment thereof.

BRIEF DESCRIPTION OF THE DRAWINGS

The drawings refer to embodiments of the present disclosure in which:

FIG. 4 is a schematic illustrating an exemplary embodiment of a workflow method utilizing fully automated dock equipment incorporated into a truck trailer docking bay in accordance with the present invention;

FIG. 5 is a table illustrating a multiplicity of certain parameters pertaining to aligning a truck trailer at a dock, according to the present disclosure; and FIG. 6 is a table illustrating a multiplicity of certain dimensions pertaining to aligning a truck trailer at a dock in accordance with the present disclosure.

Figure 1:
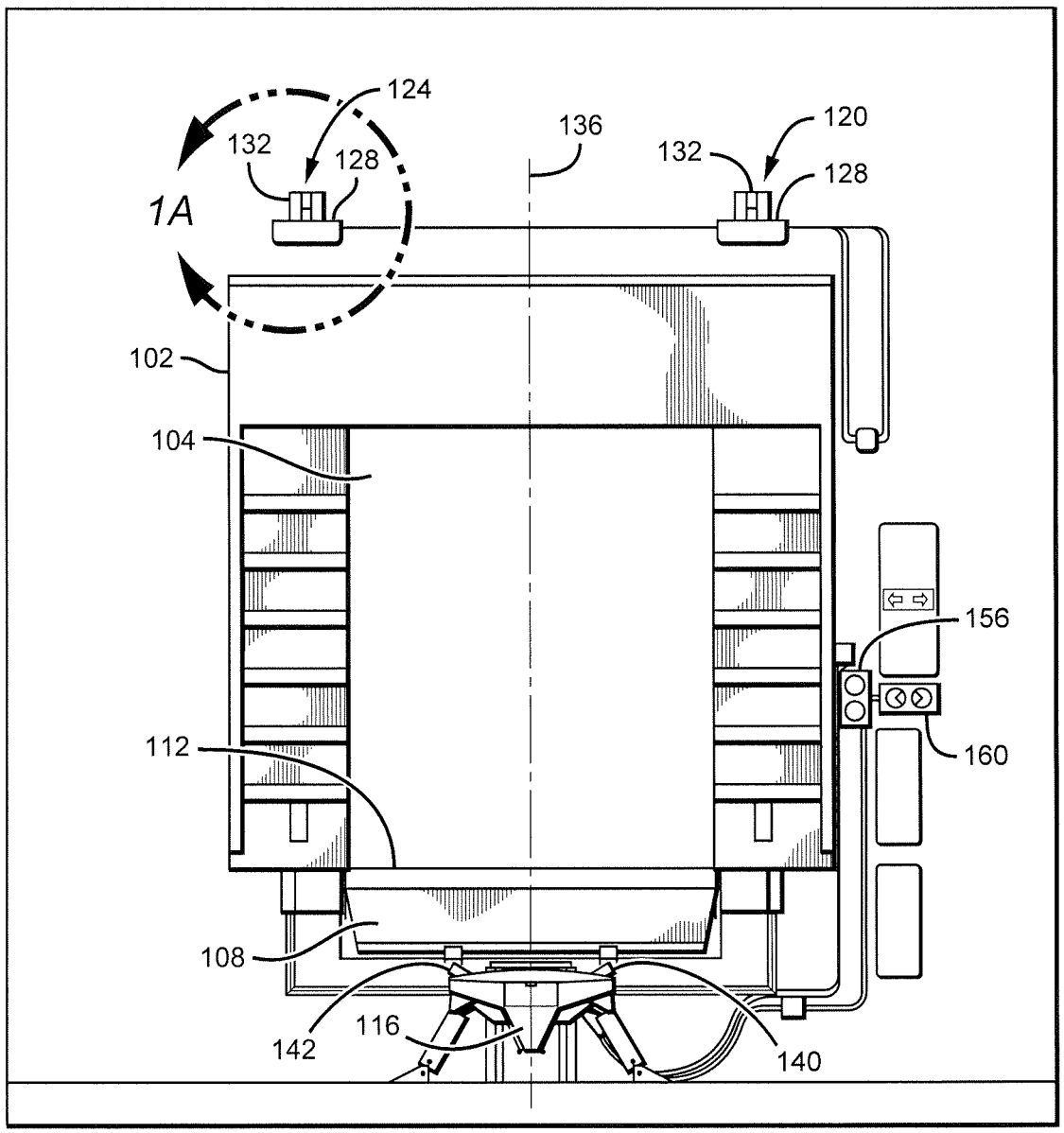
FIG. 1 is a plan view of an exemplary embodiment of a truck trailer docking bay according to the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present invention. It will be apparent, however, to one of ordinary skill in the art that the present invention may be practiced without these specific details. In other instances, well known components or methods have not been described in detail but rather in a block diagram, or a schematic, in order to avoid unnecessarily obscuring the present invention. Further specific numeric references such as "first dock," may be made. However, the specific numeric reference should not be interpreted as a literal sequential order but rather interpreted that the "first dock" is different than a "second dock." Thus, the specific details set forth are merely exemplary. The specific details may be varied from and still be contemplated to be within the spirit and scope of the present invention. The term "coupled" is defined as meaning connected either directly to the component or indirectly to the component through another component.

In general, the present disclosure describes a system and method for automatically engaging a truck trailer at a loading dock. The system comprises a signal system, such as a programmable logic controller (PLC) system, configured to switch the loading dock to a ready-to-engage mode whereby the loading dock is ready to accept an incoming truck trailer. In some embodiments, the system engages automatically when a trailer is properly parked at the loading dock. At least a first sensor and a second sensor are configured to measure an alignment of a trailer relative to a centerline of the loading dock. Further, at least a third and fourth sensors and a fourth sensor are configured to measure a distance between the wall of the loading dock and a rearmost portion of the incoming trailer and the angle of such. In an embodiment, the first, second, third, and fourth sensors comprise a laser guided vehicle (LGV) system. Outside signal lights operating in response to signals from the first sensor and the second sensor provide feedback to a truck driver backing the incoming trailer toward the dock door. A vehicle restraint system engages the trailer in response to signals passed to the PLC system from the first sensor, the second sensor, the third sensor, and the fourth sensor. A dock door opens once the trailer is engaged with the vehicle restraint system. A dock leveler deploys after the dock door opens. The dock leveler provides a smooth transition between the trailer and a floor of the loading dock. An inside dock light indicates to dock personnel, such as a forklift operator, that the truck is ready to be serviced after the dock leveler deploys. Once servicing of the trailer is finished, the forklift operator may initiate releasing the trailer from the loading dock by way of PLC communication.

FIG. 1 illustrates an exemplary embodiment of a docking bay 100 according to the present disclosure. The docking bay 100 is configured to receive a truck trailer with the trailer doors opened so as to facilitates unloading and loading items that are shipped within the trailer. The docking bay 100 comprises a shelter 102 surrounding an overhead door 104 which is configured to be rolled upwards and allow entry into the interior of the truck trailer. A dock leveler 108 is configured to provide a smooth transition between the trailer and a floor 112 of the loading dock. The docking bay 100 further comprises a vehicle restraint system 116 configured to engage the trailer. As described below, the vehicle restraint system 116 typically is a hydraulic restraining device used to fixate trucks and semi-trailers to the face of the loading dock.

Figure 2:
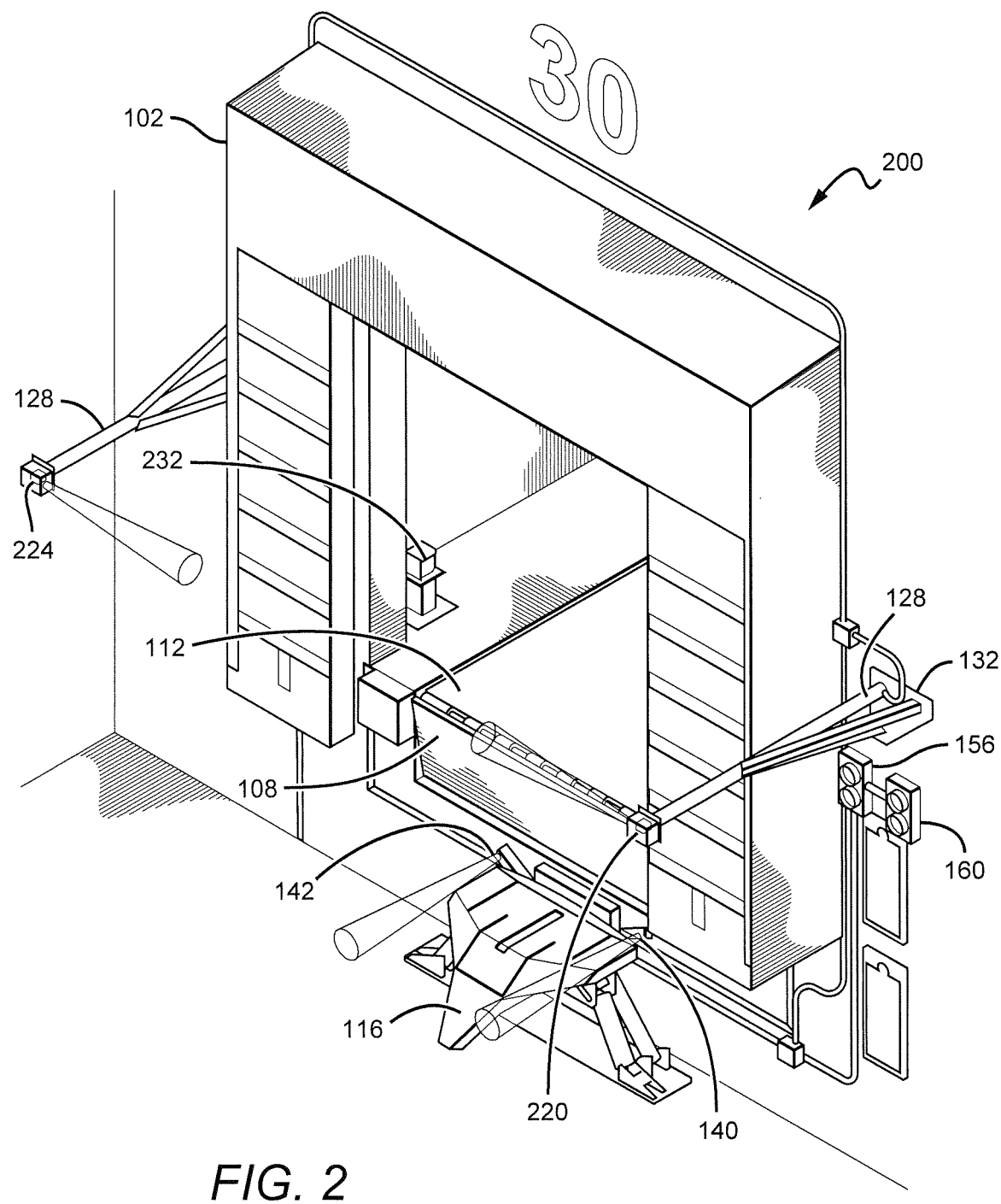
FIG. 2 is an isometric view of an exemplary embodiment of a truck trailer docking bay in accordance with the present disclosure.

Above the overhead door 104 is a first sensor pair 120 and a second sensor pair 124. Supporting each of the first and second sensor pairs 120, 124 is a beam 128 fastened above the docking bay 100 by way of a mount 132. As best shown in FIG. 2, the beams 128 generally are elongate members configured to support the sensors 120, 124 in an extended position suitable for detecting an alignment of an approaching truck trailer, as described herein. As shown in FIG. 1, the first and second sensor pairs 120, 124 preferably are positioned with a substantially equivalent distance from a dock centerline 136 and a substantially equal height above a top of the shelter 102.

Figure 1A:
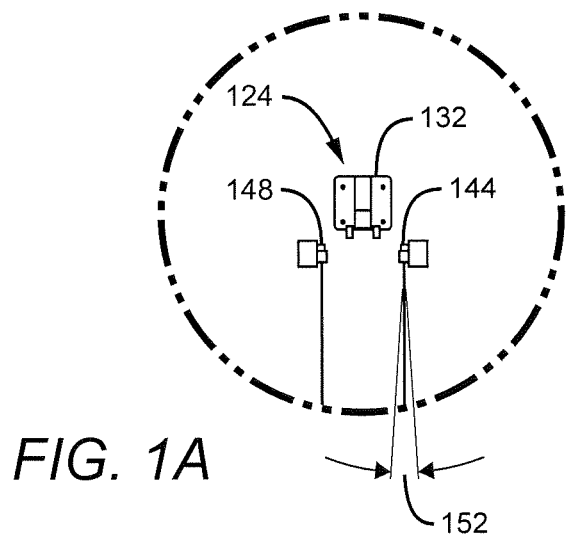
FIG. 1A illustrates a close-up view of sensors incorporated into the exemplary embodiment of the truck trailer docking bay illustrated in FIG. 1, according to the present disclosure.

FIG. 1A illustrates a close-up view of the sensor pair 124 with the beam 128 removed for the sake of clarity. As with the sensor pair 120, the sensor pair 124 comprises a first sensor 144 and a second sensor 148 positioned adjacent to one another such that the sensors 144, 148 have a substantially equal height above the top of the shelter 102. Preferably, the sensors 144, 148 are oriented vertically so as to detect the presence of a top of the truck trailer. The sensors 144, 148 may each be adjusted within an angle 152 relative to true vertical so as to account for slight variations in alignment that may exist within the beam 128 and the mount 132. In the illustrated embodiment, the sensors 144, 148 are of the laser guided vehicle (LGV) variety. It is contemplated, however, that various other suitable types of sensor may be utilized for the sensors 144, 148, such as, by way of example, ultrasonic sensors.

In addition to the first and second sensor pairs 120, 124, a sensor 140 and a sensor 142 are located below the floor 112 of the loading dock behind the vehicle restraint system 116. Although each of the sensors 140, 142 comprises one sensor, it is contemplated that in some embodiments the sensors 140, 142 may each comprise more than one sensor, such as, for example, two adjacently disposed sensors. Further, as stated above with respect to the sensors 144, 148, the sensors 140, 142 preferably are LGV sensors, although other types of suitable sensors are contemplated.

On a driver side location of the docking bay 100 is system of indicator lights configured to assist the truck driver with backing the truck trailer into the docking bay 100. As described in detail below, outside signal lights 156 generally are configured to indicate to the driver when to proceed with backing the truck trailer into the docking bay 100 and when to stop. Directional arrow lights 160 are configured to help the driver to properly orient the trailer with respect to the docking bay 100. FIG. 5 illustrates a multiplicity of certain parameters pertaining to aligning the truck trailer at the docking bay 100. The outside signal lights 156 and the directional arrow lights 160 operate in response to signals from the PLC system based on orientation data obtained by way of the sensors 120, 124, 140, 142 to ensure that the truck trailer is properly centered and aligned in the docking bay 100 in accordance with at least one of the certain parameters illustrated in FIG. 5, including, but not necessarily limited to an angle between the dock and the trailer, an offset between the centerline 136 and the centerline of the trailer, and a distance between dock wall and the rearmost portion of the trailer. Further, as best shown in FIG. 2, an inside signal light 232 indicates the status of the trailer to dock personnel, and is particularly useful during times when the overhead door 104 is closed.

Figure 3:
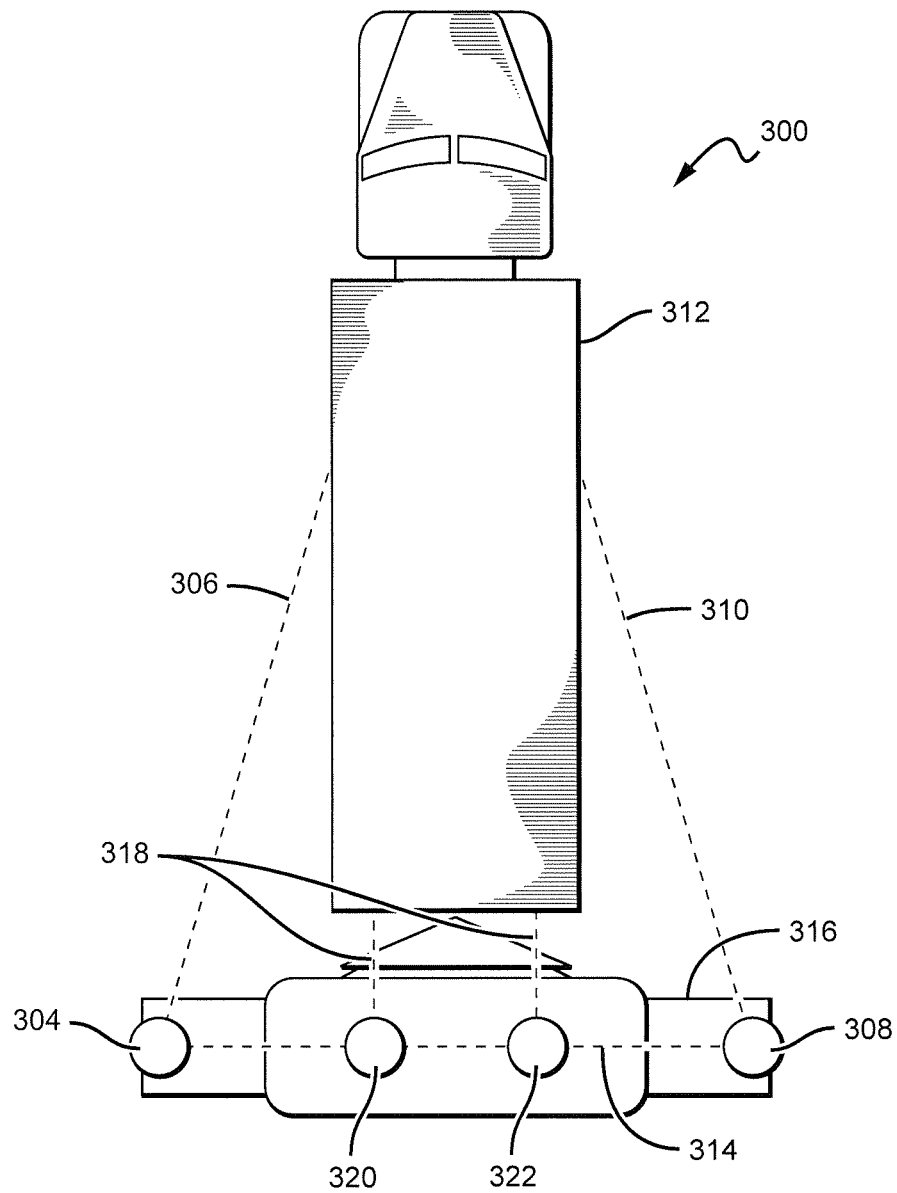
FIG. 3 illustrates a top view of an exemplary embodiment of multiple sensors being used to align a truck trailer and trigger an engagement of dock equipment, according to the present invention.

FIG. 3 illustrates a top view of an exemplary embodiment 300 of sensors being used to align a trailer and trigger an engagement of dock equipment. In the embodiment illustrated in FIG. 3, a first sensor 304 and a second sensor 308 are used to measure respective distances 306 and 310 the distance between a trailer 312 and a wall 316 of the dock. As will be appreciated, knowledge of distances 306, 310, as well as a distance 314 between the sensors 304, 308 facilitates determining whether the trailer 312 is aligned with the dock door. A third sensor 320 and a fourth sensor 322 measure a distance 318 between dock door and the rearmost portion of trailer 312, as well as determining whether or not the trailer doors are open. As will be appreciated, in the embodiment illustrated in FIG. 1, the sensor pairs 120, 124 perform the operation of the first and second sensors 304, 308, respectively, and thus the sensor pairs 120, 124 ensure that the trailer is properly aligned at the docking bay 100. Similarly, the sensors 140, 142 perform the operation of the third and fourth sensors 320, 322, illustrated in FIG. 3, ensuring that the trailer is parked with a proper distance from the wall 316 of the docking bay. In some embodiments, one or both of the sensors 140, 142 are used to determine whether or not the trailer doors are open, as well as providing a further determination of the alignment of the trailer 312.

Preferably, an angle between the truck trailer and the docking bay 100 is to be not greater than substantially 1 degree. Further, an offset between the centerline 136 and the centerline of the truck trailer 312 preferably is to be not greater than substantially 6 inches. FIGS. 5-6 respectively illustrate a multiplicity of certain parameters and dimensions that may be used in the course of operating the docking bay 100 in accordance with the present disclosure. As will be appreciated, in other embodiments than illustrated herein, other parameters and dimensions may be utilized to advantageously receive truck trailers into the docking bays. As such, it should be understood that the docking bay 100 of the present disclosure is not to be limited to the certain parameters and dimensions disclosed in FIGS. 5-6, but rather a wide variation of the parameters and dimensions disclosed in FIG. 5-6 may be used in conjunction with the docking bay without deviating beyond the spirit and scope of the present disclosure.

FIG. 2 is an isometric view of an exemplary embodiment of a docking bay 200 in accordance with the present disclosure. The docking bay 200 is substantially similar to the docking bay 100, as well as the operation thereof, with the exception that the docking bay 200 comprises a first sensor 220 and a second sensor 224 that are positioned on opposite sides of the shelter 102. As shown in FIG. 2, the sensors 220, 224 are oriented in a horizontal configuration and directed toward one another so as to detect the presence of the sides of a truck trailer, such as the trailer 312. In the embodiment illustrated in FIG. 2, each of the sensors 220, 224 comprises an individual ultrasonic sensor suitable for detecting the trailer 312. In other embodiments, however, the sensors 220, 224 may be comprised of more than one sensor, such as, by way of example, two horizontally disposed sensors. Further, it is contemplated that the sensors 220, 224 need not be limited to ultrasonic sensors, but rather the sensors 220, 224 may be comprised of any type of sensor suitable for detecting the presence of the trailer 312, such as LGV sensors, as described in connection with FIG. 1.

As stated above, the docking bays 100, 200 generally comprise a programmable logic controller (PLC), or an automated PLC system, which is configured to process stored instructions. As such, it should be understood that the PLC incorporated into each of the docking bays 100, 200 processes the stored instructions which causes the docking bays 100, 200 to perform operations, discussed herein, so as to guide the truck trailer 312 into and out of the docking bays. It should be further understood that the PLC incorporated into each of the docking bays 100, 200 is configured to allow for human interaction, such that the docking bays 100, 200 may be switched into a manual operational mode.

FIG. 4 is a schematic illustrating an exemplary embodiment of a workflow method 400 utilizing an automated PLC system coupled with dock equipment to provide a fully automated docking bay, such as the docking bays 100, 200. In the following paragraphs, the workflow method 400 is described in connection with the docking bay 100 for the sake of brevity. It should be understood, however, that the workflow method 400 may be performed with the docking bay 200, as well as various other embodiments of automated docking bays, without limitation.

The workflow method 400 begins at a step 404 when a trailer truck, such as the trailer 312, arrives at a front gate or security post at a distribution center or shipping plant. A driver of the truck preferably provides a purchase order number or trip number to a shipping clerk at the gate. At step 408, the shipping clerk assigns the truck to a dock door, such as the docking bay 100. In some embodiments, the shipping clerk may use a signal system to switch the assigned docking bay into a ready-to-engage mode. The ready-to-engage mode prepares dock equipment at the docking bay to receive the incoming truck. It is envisioned that the shipping clerk readies the dock equipment by way of a digital signal initiated at the front gate by way of a button, switch, touch screen, or any other suitable interface. In some embodiments, the shipping clerk may switch a System Key to an Automatic Mode position, and an Automatic Mode pilot light may switch on to indicate that the system is ready for automation. In other embodiments, the system engages automatically when the trailer 312 is properly parked at the docking bay.

Once the docking bay 100 is ready to accept the incoming truck, the overhead door 104 is maintained in a closed position, the dock leveler 108 is stored and disabled, and the vehicle restraint system 116 is disengaged and disabled. The outside signal lights 156 flash green to indicate to the truck driver that the docking bay is ready to receive the trailer 312, while the directional arrow lights 160 remain off. The inside dock light 232 flashes red to indicate to workers within the warehouse, such as dock personnel, that the trailer 312 is not yet ready to be serviced.

At a step 412, the sensors 120, 124, 140, 142 monitor the trailer 312 as the driver backs the trailer toward the assigned docking bay 100. It will be appreciated that the driver opens the trailer doors before backing the trailer toward the dock door. At a step 416, the sensors determine whether or not the trailer 312 is properly aligned with the dock door. At a step 420, at least one sensor determines whether or not the trailer doors are open. If a misalignment of the trailer is detected in step 416, or closed trailer doors are detected at step 420, the driver is alerted at a step 424.

During backing of the trailer 312 into the docking bay 100, as the trailer 312 enters a detection zone of the sensor pairs 120, 124, the directional arrow lights 160 remain off while the trailer is properly centered relative to the dock centerline 136. If the trailer is not properly centered, however, either a passenger side or a driver side of the directional arrow lights 160 will illuminate with a steady yellow color. If the trailer has an improper offset angle relative to the dock centerline 136, either the passenger side or the driver side of the directional arrow lights 160 will flash yellow. It should be understood that when an individual directional arrow light illuminates or flashes, it is communicating to the driver to move the trailer in the direction of the individual directional arrow light.

When the trailer 312 is properly oriented during backing into the docking bay 100, the directional arrow lights 160 both illuminate with the steady yellow color. In other embodiments, the driver may be alerted by way of various other signals, such as different colors, flashing lights, audible sounds, horns, beeps, and the like. In another embodiment, a first light having one color may be used to indicate a misalignment of the truck, and a second light having a second color may be used to indicate closed trailer doors. Once alerted at step 424, the driver generally must attempt to realign the trailer 312 with the docking bay 100 and ensure that the trailer doors are open.

Once the sensors 120, 124, 140, 142 determine that the trailer 312 is correctly aligned and centered within the docking bay 100, and that the trailer doors are open, at a step 428 the outside signal lights 156 switch from green to red to indicate to the driver to stop backing the trailer 312 into the docking bay. During step 428, the directional arrow lights 160 turn off. The inside dock light 232 switches from red to a flashing green color to indicate to dock personnel that the truck has been signaled to stop backing into the docking bay 100. In some embodiments, an additional interior beacon may be configured to flash so as to gain the attention of dock personnel. In other embodiments, however, the driver and dock personnel may be alerted by way of a variety of other types of signals, such as different colors, flashing lights, audible horns, sounds, beeps, as mentioned above.

Once the outside signal lights 156 switch to red, at step 428, a timed delay commences, such as a 10-second delay, after which the vehicle restraint system 116 attempts to engage the trailer 312. The vehicle restraint system 116 typically is a hydraulic, self-aligning restraining device used to secure trucks and semi-trailers having an intact Rear Impact Guard (RIG) to the face of the docking bay 100. It will be recognized by those skilled in the art that the vehicle restraint system 116, when engaged, limits vertical motion of the trailer 312 during loading and/or unloading by securing the RIG by way of a hydraulically positioned steel hook, while support cylinders extend under the trailer 312 to the limit vertical motion. Further, engaging the trailer 312 with the vehicle restraint system 116 prevents forward movement of the trailer and truck which would otherwise create a dangerous gap between the face of the docking bay and the rear of the trailer. In some embodiments, the vehicle restraint system 116 may further operate as an obstruction noticeable to the driver, in the event the driver mistakenly attempts to pull the truck away from the dock while the trailer 312 is being loaded and/or unloaded.

In an event that the vehicle restraint system 116 fails to properly engage the trailer 312, the automated PLC system switches to an Alarm Mode, at which point the outside signal lights 156 and the inside dock light 232 switch to simultaneously flashing red and green to indicate that a fault has occurred. In some embodiments, an audible alarm may sound inside and outside of the docking bay 100 to bring attention to the fault. It is contemplated that a supervisor must enter a Horn Override code to silence the audible alarm. Once the Alarm Mode is initiated, human intervention is required to verify that the trailer 312 is suitably secured and determine the cause of the fault. In some embodiments, dispatch office personnel may decide whether to turn away the trailer 312 from the docking bay 100 or switch the docking bay to a Manual Mode of operation.

Once the vehicle restraint system 116 successfully engages the trailer 312, the workflow method 400 advances to a step 432 wherein the overhead door 104 automatically opens. In one embodiment, one or more of the sensors 140, 142 are used to verify that the trailer doors are open, and that the dock leveler 108 is clear of obstruction. When the dock leveler is not clear, the automated PLC system waits until the obstruction is removed from the dock leveler 108 before proceeding, following a timed delay, such as a 2-second delay. Once the automated PLC system verifies that the overhead door 104 is open, the trailer doors are open, and the dock leveler 108 is clear, the workflow method 400 advances to a step 436 wherein the dock leveler 108 automatically raises, extends toward the rear of the trailer 312, and lowers onto a bed of the trailer 312. It will be recognized that dock levelers generally provide a smooth transition between the trailer 312 and the floor 112 of the loading dock, thereby minimizing jolts and jarring to forklift operators and damage to products and equipment due to "dock shock."

With the dock leveler 108 deployed in a suitable position, the automated PLC system returns a "Dock Ready" signal to the dispatch office and the inside dock light 232 is turned off so as to indicate to a forklift operator, or other personnel, that the trailer 312 is secured and ready to be serviced by loading and/or unloading. In some embodiments, the inside dock light 232 may be turned green so as to indicate that the trailer 312 is ready to be serviced. Further, in some embodiments an Automatic Mode pilot light may be illuminated so as to indicate to dispatch personnel that the trailer is being services. It should be understood, however, that any automation fault will halt the workflow method 400 and cause the Automatic Mode pilot light to be turned off, at which point human intervention will be required to determine the nature of the fault.

Once loading and/or unloading the trailer 312 is finished, at a step 440 the forklift operator indicates that the trailer 312 is ready to be released from the dock. In an embodiment, the forklift operator may indicate that the truck is ready to leave the docking bay simply by PLC communication. For example, the forklift operator may use a button or switch to initiate a "Remote Disengage Request" that is received by the automated PLC system, or is sent to the dispatch office for acknowledgement. Once the "Remote Disengage Request" is accepted, the workflow method 400 advances to a step 444. At the step 444, the inside dock light 232 begins flashing red while the automation PLC system verifies that the dock leveler 108 is clear of obstruction before returning the dock leveler to a folded position, illustrated in FIGS. 1-2. In some embodiments, an interior beacon may flash red for 15 seconds to indicate to dock personnel that withdrawal of the dock leveler 108 has begun. After the lock leveler 108 successfully returns to the folded position, the overhead door 104 is closed at a step 448. At a step 452, the vehicle restraint system 116 disengages from the trailer 312 and then the outside signal lights 156 switch from red to green to indicate to the driver that the trailer 312 is finished being serviced. Simultaneously, the docking bay 100 shows as available to dispatch personnel, or to a shipping clerk at the front gate. The truck driver may pull the trailer 312 away from the docking bay 100, close the trailer doors, and then proceed to the front gate to check out with the shipping clerk.

It should be understood that in the event of a fault, the automated PLC system may be switched to a Manual Mode of operation, as mentioned above. In the Manual Mode, dock personnel may operate the equipment at the docking bay 100 by using various switches, keys, controls, or buttons. For example, once the trailer 312 is properly parked at the docking bay 100, a dock operator may press a Lock button to activate the vehicle restraint system 116 to secure the trailer. If the vehicle restraint system 116 fails to properly engage the trailer, the Alarm Mode is initiated, as described above. Once the trailer is properly secured, the operator may press a Door Open button to raise the overhead door 104 and enable the dock leveler 108. After the operator verifies that the overhead door 104 is open, the trailer doors are open, and the dock leveler 108 is clear of obstruction, the operator may press a Leveler Raise button to extend the dock leveler 108 toward the rear of the trailer 312. After the dock leveler 108 lowers onto the bed of the trailer 312, a "Dock Ready" signal may be returned by the automated PLC system. The trailer 312 may then be serviced by loading and/or unloading contents therein.

Once the forklift operator indicates that the trailer 312 is ready to be released from the dock, the operator may again press the Leveler Raise button to raise and retract the dock leveler 108. Once the dock leveler 108 withdraws into the folded position, the operator may press a Door Close button to lower and close the overhead door 104. After the overhead door 104 closes, the operator may press an Unlock button to disengage the vehicle restraint system 116 from the trailer 312. In some embodiments, the inside dock light 232 may begin flashing red, and the outside signal lights 156 may switch to flashing green to indicate to the driver that the trailer 312 may depart from the docking bay 100.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A system for servicing a truck trailer at a docking bay, comprising:
 a programmable logic controller (PLC) system;
 one or more bay sensors to detect an angle between a centerline of the docking bay and the truck trailer during backing into the docking bay;
 one or more dock sensors to detect a distance between a wall of the docking bay and a rearmost portion of the truck trailer;
 a first alert system in communication with the PLC system and configured to operate in response to signals from the one or more bay sensors, and the one or more dock sensors;
 a vehicle restraint system in communication with the PLC system and configured to fixate the truck trailer within the docking bay, wherein the vehicle restraint system engages the truck trailer following a time delay after the truck is sufficiently positioned within the docking bay;
 an overhead door in communication with the PLC system, wherein the overhead door is configured to open once the trailer is fixated by the vehicle restraint system;
 a dock leveler in communication with the PLC system and configured to deploy after the overhead door opens; and
 a second alert system in communication with the PLC system and configured to indicate a status of the truck trailer to dock personnel.

2. The system of claim 1, wherein once the vehicle restraint system engages the truck trailer, the overhead door is opened and the docket leveler is deployed.

3. The system of claim 1, wherein the first alert system comprises directional arrow lights configured to help the driver to properly orient the truck trailer with respect to the centerline of the docking bay, and wherein a passenger side and a driver side of the directional arrow lights communicate to the driver directions to steer the trailer.

4. The system of claim 3, wherein the directional arrow lights remain off while the truck trailer is properly aligned with the centerline.

5. The system of claim 3, wherein either the passenger side or the driver side of the directional arrow lights illuminate with a steady yellow color when the trailer is not properly aligned with the centerline.

6. The system of claim 3, wherein either the passenger side or driver side of the directional arrow lights flash yellow when the trailer has an improper offset angle relative to the centerline of the docking bay.

7. A system for engaging a truck trailer at a docking bay, the system comprising:
 one or more sensors positioned to detect a position of the truck trailer relative to the docking bay;
 a vehicle restraint system configured to selectively engage the truck trailer at the docking bay; and
 an electronic controller configured to:
  receive signal output from the one or more sensors;
  detect, based on the signal output, when the truck trailer is sufficiently positioned within the docking bay; and
  operate the vehicle restraint system to engage the truck trailer following expiration of a time delay after detecting that the truck trailer is sufficiently positioned within the docking bay.

8. The system of claim 7, further comprising an overhead door, wherein the electronic controller is configured to automatically cause the overhead door to open in response to the vehicle restraint system engaging the truck trailer.

9. The system of claim 7, further comprising a dock leveler, wherein the electronic controller is configured to automatically deploy the dock leveler in response to the vehicle restraint system engaging the truck trailer.

10. The system of claim 7, wherein the one or more sensors includes a first bay sensor and a second bay sensor positioned at a substantially equal height above a top of a dock shelter and positioned on opposite sides of a centerline of the docking bay,
 wherein the electronic controller is further configured to determine, based on a sensor output from the first bay sensor and a sensor output of the second bay sensor, an angle between the centerline of the docking bay and the truck trailer backing into the docking bay, and
 wherein the electronic controller is configured to detect when the truck trailer is sufficiently positioned within the docking bay by determining that the truck trailer is aligned with the centerline of the docking bay based at least in part on the determined angle.

11. The system of claim 10, wherein the one or more sensors further includes a dock sensor positioned at a height below a floor of the docking bay,
 wherein the electronic controller is further configured to determine, based on a second output from the dock sensor, a distance between a wall of the docking bay and a rearmost portion of the truck trailer, and
 wherein the electronic controller is configured to detect when the truck trailer is sufficiently positioned within the docking bay based on the determined distance while the truck trailer is concurrently aligned with the centerline of the docking bay.

12. The system of claim 11, wherein the first bay sensor, the second bay sensor, and the dock sensor are laser guided vehicle (LGV) sensors.

13. The system of claim 10, further comprising a first alert system including directional arrow lights positioned external to the docking bay,
 wherein the electronic controller is further configured to selectively and controllably illuminate the directional arrow lights to communicate to a driver of a truck coupled to the trailer directions for steering the trailer to align the truck trailer with the centerline of the docking bay based at least in part on the determined angle between the centerline of the docking bay and the truck trailer.

14. The system of claim 13, wherein the electronic controller is configured to illuminate the directional arrow lights to communicate to the driver of the truck by
 causing the directional arrow lights to be unilluminated in response to determining that the truck trailer is properly aligned with the centerline of the docking bay,
 illuminating a first directional arrow light in response to determining that the truck trailer is not properly aligned with the centerline of the docking bay and that the truck trailer must be steered in a first direction corresponding to the first directional arrow light in order to achieve the proper alignment, and
 illuminating a second directional arrow light in response to determining that the truck trailer is not properly aligned with the centerline of the docking bay and that the truck trailer must be steered in a second direction corresponding to the second directional arrow light in order to achieve the proper alignment.

15. The system of claim 14, wherein illuminating the first directional arrow light and illuminating the second directional arrow light includes one selected from a group consisting of illuminating the directional arrow light with a steady yellow color and intermittently flashing the directional arrow light with a yellow color.

16. The system of claim 7, further comprising an inside dock light, wherein the electronic controller is configured to cause the inside dock light to flash in a red color to indicate to dock personnel that the truck trailer approaching the docking bay is not yet engaged by the vehicle restraint system.

17. The system of claim 7, further comprising an outside dock light, wherein the electronic controller is configured to selectively operate the outside dock light by
causing the outside dock light to illuminate in a green color to indicate that the docking bay is ready to receive the truck trailer, and
causing the outside dock light to switch from the green color to a red color to indicate to the truck driver to stop backing the trailer into the docking bay in response to detecting that the truck trailer is sufficiently positioned within the docking bay.

18. The system of claim 7, wherein the electronic controller is further configured to
detect a fault condition when the vehicle restraint system fails to properly engage the truck trailer, and
generate an alarm signal in response to detecting the fault condition.

19. The system of claim 18, further comprising an inside dock light and an outside dock light, and wherein the electronic controller is configured to generate the alarm signal by causing the inside dock light and the outside dock light to flash red and green simultaneously.

20. A method of engaging a truck trailer at a docking bay, the method comprising:
receiving, by an electronic controller, a signal output from the one or more sensors, wherein the one or more sensors are positioned to detect a position of the truck trailer relative to the docking bay;
detecting, by the electronic controller based on the received signal output, when the truck trailer is sufficiently positioned within the docking bay by determining that a rearmost portion of the truck trailer is within a defined distance from a wall below the docking bay and that an angle between the truck trailer and a centerline of the docking bay is within a threshold angle offset; and
operating, by the electronic controller, the vehicle restraint system to automatically engage the truck trailer following expiration of a time delay after detecting that the truck trailer is sufficiently positioned within the docking bay.

* * * * *